US012055190B2

United States Patent
Peet et al.

(10) Patent No.: US 12,055,190 B2
(45) Date of Patent: Aug. 6, 2024

(54) METHOD AND APPARATUS FOR EFFICIENT CLUTCH ENGAGEMENT

(71) Applicant: PT Tech, LLC, Wadsworth, OH (US)

(72) Inventors: Brian James Peet, Akron, OH (US); Ian Patrick Kay, Fairlawn, OH (US); John George Stratigakis, Medina, OH (US)

(73) Assignee: PT Tech, LLC, Wadsworth, OH (US)

( * ) Notice: Subject to any disclaimer, the term of this patent is extended or adjusted under 35 U.S.C. 154(b) by 0 days.

(21) Appl. No.: 18/548,978

(22) PCT Filed: Mar. 5, 2021

(86) PCT No.: PCT/US2021/021081
§ 371 (c)(1),
(2) Date: Sep. 5, 2023

(87) PCT Pub. No.: WO2022/186836
PCT Pub. Date: Sep. 9, 2022

(65) Prior Publication Data
US 2024/0151280 A1    May 9, 2024

(51) Int. Cl.
*F16D 48/06* (2006.01)
*F16D 25/0635* (2006.01)

(52) U.S. Cl.
CPC ....... *F16D 48/066* (2013.01); *F16D 25/0635* (2013.01); *F16D 2500/1026* (2013.01);
(Continued)

(58) Field of Classification Search
CPC ............ F16D 48/66; F16D 2500/1026; F16D 2500/10412; F16D 2500/1045; F16D 2500/30415; F16D 2500/30426; F16D 2500/3064; F16D 2500/3065; F16D 2500/3068; F16D 2500/70406; F16D 2500/30404; F16D 2500/30421; F16D 2500/50296; F16D 2500/70428; F16D 2500/70426

See application file for complete search history.

(56) References Cited

U.S. PATENT DOCUMENTS 5,070,747 A * 12/1991 Lentz .................... F16H 61/061
477/149
6,368,249 B1    4/2002 Hubbard
(Continued)

*Primary Examiner* — Timothy Hannon
(74) *Attorney, Agent, or Firm* — Renner, Kenner, Greive, Bobak, Taylor & Weber

(57) ABSTRACT

A method for effecting efficient engagement of a clutch to interconnect an engine and an implement which monitors operational parameters of the engine and implement and determines from those operational parameters at least two ramp rates for the application of hydraulic pressure to the clutch. The hydraulic pressure is applied at a first ramp rate to the clutch for a first period and applied at a second ramp rate to the clutch for a second period. A determination is made from the relationship between the input and output speeds of the clutch whether the clutch is fully engaged. If it is not fully engaged, clutch pressure is released and the ramp rates are reevaluated and reset. They are then sequentially applied for the first and second periods. The process repeats until full engagement is achieved or a determination is made that full engagement cannot be achieved.

11 Claims, 2 Drawing Sheets

(52) U.S. Cl.
CPC .............. *F16D 2500/10412* (2013.01); *F16D 2500/1045* (2013.01); *F16D 2500/30415* (2013.01); *F16D 2500/30426* (2013.01); *F16D 2500/3064* (2013.01); *F16D 2500/3065* (2013.01); *F16D 2500/3068* (2013.01); *F16D 2500/70406* (2013.01)

(56) References Cited

U.S. PATENT DOCUMENTS

| | | |
|---|---|---|
| 2003/0087726 A1 | 5/2003 | Mack et al. |
| 2017/0138468 A1 | 5/2017 | Fiore et al. |
| 2017/0219092 A1 | 8/2017 | Kuros |

* cited by examiner

| Hydraulic Ramp Rates | | | | | | | | |
|---|---|---|---|---|---|---|---|---|
| Engage Speed Range | λ1 | λ2 | λ1 | λ2 | λ1 | λ2 | λ1 | λ2 |
| | D | | E | | F | | G | |
| Temp A | X | Y | X | 1.2Y | X | 1.5Y | X | 1.8Y |
| Temp B | 1.5X | 1.3Y | 1.5X | 1.5Y | 1.5X | 1.8Y | 1.5X | 2.1Y |
| Temp C | 1.5X | 1.6Y | 1.5X | 1.8Y | 1.5X | 2.1Y | 1.5X | 2.4Y |

METHOD AND APPARATUS FOR EFFICIENT CLUTCH ENGAGEMENT

TECHNICAL FIELD

The invention herein resides in the art of power transmission devices and, more particularly, to methods and apparatus for interengaging power sources with driven devices. More particularly, the invention relates to a method and apparatus for efficiently engaging an engine with a power-driven device in such a manner as to minimize wear and tear on the clutch assembly without sacrificing speed or efficiency of such engagement.

BACKGROUND ART

In many industrial applications, a power source, such as an engine, is required to engage with a driven unit, such as an implement or the like, to perform a work function. Often times, the implements are characterized by a high inertia, frustrating the effort of the engine to begin operation of the implement. When the implement presents a high inertia load, the clutch provided to achieve the desired engagement often slips and wears as a result of the energy dissipated by the clutch during the engagement process.

In the past, small engines would often stall during the engagement process. Accordingly, to allow a single clutch design to service multiple applications of loads and engine sizes, the clutch and its operation were often configured to service the most problematic power source and load that might be encountered. This greatly impacted the efficiency of the clutch when used in other applications. Clutch efficiency can only be advanced by determining the parameters that impact clutch efficiency and capitalizing on that knowledge when that clutch is employed with various power sources and loads.

In the past, it has been known to tailor clutch designs to satisfy the needs of the power source and load and to further tailor the operational engagement between the two as by "bumping" or the like at startup or operation restoration. Such bumping has typically consisted of a series or sequence of "bumps" for engagement impulses to accelerate an inertial load.

In the past, the "bumping" of the clutch by sequencing its engagement and disengagement has been rather fixed without the capability of adaptation to various power sources and loads and operational parameters. Accordingly, clutches typically absorb far more energy than is necessary to perform the engagement function, giving rise to rapid wear and attendant increases in cost of operation.

Moreover, the operational inefficiencies of operations of prior art clutches has often given rise to rapid wear and increased costs of operation.

DISCLOSURE OF INVENTION

In light of the foregoing, it is a first aspect of the invention to provide a method and apparatus for efficient clutch engagement that considers the impact of various parameters that impact such engagement.

Another aspect of the invention is the provision of a method and apparatus for efficient clutch engagement that particularly considers the impact of temperature upon clutch operation.

A further aspect of the invention is the provision of a method and apparatus for efficient clutch engagement that provides a series of "bumps" in applying actuating pressure to the clutch, with that pressure being a function of the engagement speed of the power source engine.

Yet a further aspect of the invention is the provision of a method and apparatus for efficient clutch engagement in which the actuating pressures of the clutch are two-staged, each stage being of a different ramp rate.

Still another aspect of the invention is the provision of a method and apparatus for efficient clutch engagement in which a controller is provided with information particular to the engine and driven implement to tailor ramp rates and sequences for the clutch actuation.

An additional aspect of the invention is the provision of a method and apparatus for efficient clutch engagement that employ both structural and operational characteristics of the engine and driven unit to accommodate dynamic establishment of ramp rates to achieve efficient operation.

Still a further aspect of the invention is the provision of a method and apparatus for efficient clutch engagement that is readily conducive to implementation with existing engines, clutches, and implements and is controllable by known control units once the operational parameters and their impact are known.

SUMMARY OF THE INVENTION

The foregoing and other aspects of the invention that will become apparent as the detailed description proceeds are achieved by a method for effecting efficient engagement of a clutch interposed between an engine and a driven unit, comprising: monitoring operational parameters of the engine and driven unit; determining from said operational parameters at least two ramp rates for the application of hydraulic pressure to the clutch; applying hydraulic pressure at a first of said ramp rates to the clutch for a first period; applying hydraulic pressure at a second of said ramp rates to the clutch for a second period; and determining from a relationship between input and output speeds of the clutch whether the clutch is fully engaged.

Other aspects of the invention that will become apparent herein are achieved by a method for effecting efficient engagement of a clutch interposed between an engine and an implement, comprising: monitoring operational parameters of the engine and implement that impact the engagement; providing a series of applications and releases of hydraulic pressure to the clutch, each application of hydraulic pressure having at least two ramp rates, a first ramp rate for a first period of the application and a second ramp rate for a second period of the application; and wherein said ramp rates are set as a function of the operational parameters of the engine and implement.

DESCRIPTION OF DRAWINGS

For a complete understanding of the various aspects of the invention, reference should be made to the following detailed description and accompanying drawing wherein.

DETAILED DESCRIPTION OF PREFERRED EMBODIMENT

Figures 1, 2:
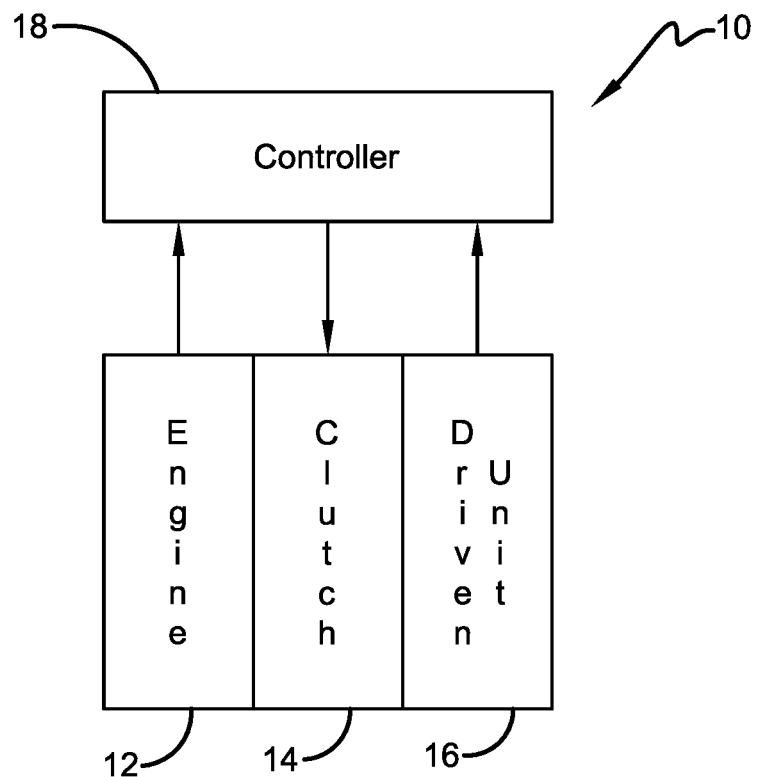
FIG. 1 is a block diagram of the basic structure of a power transmission system made in accordance with the invention.
FIG. 2 is a chart illustrating an embodiment of the invention, showing the relationship between temperature, the speed of the driving engine, and the clutch pressure ramp rates used immediately prior to clutch engagement and after such engagement for each of four speeds during any of three temperature ranges.

Referring now to the drawings and, more particularly, FIG. 1, it can be seen that a power transmission system made in accordance with the invention is designated generally by the numeral 10. The system 10 includes an appropriate power source 12, typically an internal combustion engine, but any of various power sources would suffice. The engine 12 is connected to a clutch assembly 14, which, as well known to those skilled in the art, serves to operationally interconnect the engine 12 with a driven unit or implement 16. The clutch 14 typically comprises one or more friction discs alternatingly interleaved with separator discs and sandwiched between a pressure plate and an endplate. Either the friction discs or separator discs and associated pressure plate or endplate are operatively connected to the engine, while the remaining discs and pressure plate or endplate are operatively connected to the implement 16. When the clutch 14 is engaged by the application of hydraulic pressure or the like against the pressure plate, the friction and separator discs are caused to engage with each other and the endplate and pressure plate to allow the transmission of force from the engine 12 to the implement 16. Such is well known in the art.

A controller 18 is provided in communication with the engine 12, clutch 14, and implement 16, as will be described in further detail later herein.

In the past, it has been known that the initial engagement between the engine 12 and the implement 16 often needs to occur through the implementations of a series of engagements and disengagements of the clutch 14 so as to "bump" the high-inertia implement 16 into its operative movement.

In the past, this has been achieved simply by engaging and disengaging the clutch during a sequence of applications such that each "bump" transmits more energy from the engine 12 to the implement 16 through the clutch 14 to the point where the implement reaches its operational speed. By employing the "bumps," the engine 12 does not get loaded down so much that it is likely to stall, and the clutch 14 is not driven so hard as to risk significant power loss and excessive wear.

However, and as discussed above, this process is a rather rigid one, still given to premature clutch wear and inefficient starts.

Applicants have discovered that various parameters contribute to the efficiency of the operation of the clutch assembly 14 and the system 10. They have discovered, for example, that the application of clutch pressure may occur in stages for each "bump." An initial ramp rate for the application of clutch pressure may take place until there is contact between the discs, pressure plate and endplate, followed by a second ramp following such engagement, and continuing until the load on the engine has brought it to a minimal threshold speed. The invention contemplates embodiments where the initial and second ramp rates are either faster or slower than the other.

Applicants have also found that the clutch pressure ramp rates may be tailored to accommodate the various operational temperatures of the engine and the engagement speed of the engine. These relationships are shown generally in the chart of FIG. 2, for temperature ranges A, B and C (where A is less than B, and B is less than C), engine engagement speed ranges D, E and F (where D is less than E, and E is less than F), and associated clutch pressure ramp rates X and Y.

Figure 3:
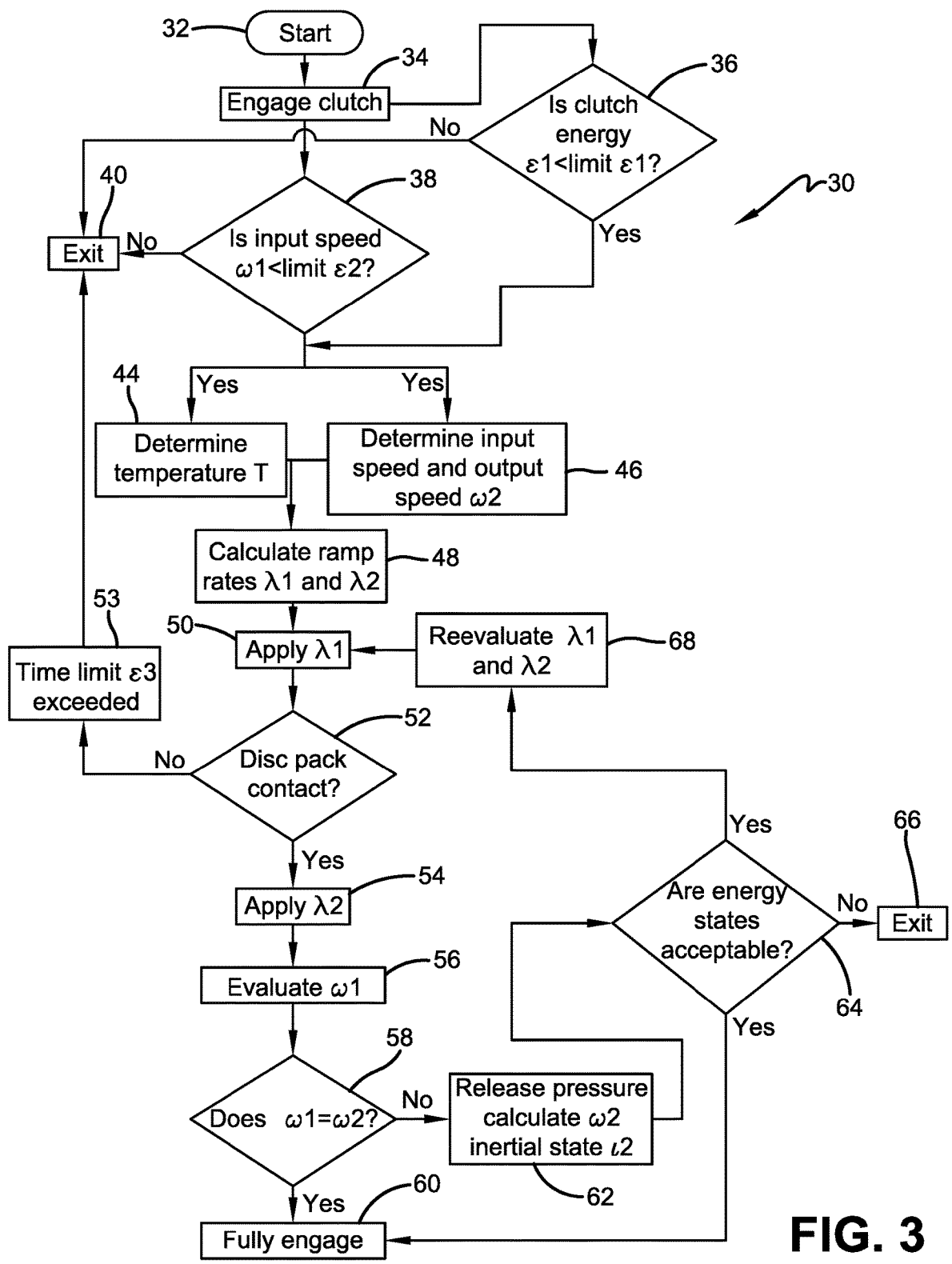
FIG. 3 is a flowchart illustrating the process of the invention employing the system of FIG. 1 and the parameters of FIG. 2.

An embodiment of the process and methodology of the invention is shown in the flowchart 30 of FIG. 3. The method starts at 32, with engagement of the clutch requested at 34. Following the request for engagement of the clutch, the clutch energy and input speed are evaluated. At 36, a determination is made as to whether the clutch energy E1 is less than a limit $\varepsilon 1$, and at 38 a determination is made as to whether the clutch input speed $\omega 1$ is less than a limit $\varepsilon 2$. If either the clutch energy E1 or clutch input speed $\omega 1$ is not less than its associated limit, the departure is made from the routine 30 as at 40.

If both the clutch energy and input speed are less than their respective limits, the clutch temperature T is determined at 44, and a determination and assessment of the input speed $\omega 1$ and output speed $\omega 2$ of the clutch is made at 46. At 48, a determination is made of the slow ramp rate $\lambda 1$ and the fast ramp rate $\lambda 2$ by either calculation or resort to a table such as shown in FIG. 2. The slow ramp rate of clutch pressure is then applied at 50 and a determination is made at 52 as to whether the friction and separator discs of the clutch have made contact. If disc contact has not been effected within a time limit such as $\varepsilon 3$ at 53, the routine 30 ends at the exit 40. If, however, disc pack contact has been determined at 52, the fast ramp rate $\lambda 2$ is engaged as at 54.

As the pressure ramp rate $\lambda 2$ is engaged, an evaluation is made of the clutch input speed $\omega 1$ at 56 such that a comparison can be made at 58 of the input speed $\omega 1$ and output speed $\omega 2$. When the two are equal, the clutch is fully engaged at 60 and the routine 30 ends. If the input and output speeds are not equal, as determined at 58, clutch pressure is released at 62, a measurement of clutch output speed $\omega 2$ and pressure ramp $\lambda 2$ is used to determine inertial state i2 of implement 16. During the preceding, the rate of change of both input $\omega 1$ and inertial state i2 are calculated as variables $\Delta\omega 1$ and $\Delta i2$. A determination is made at 64 as to whether the energy states of the clutch are acceptable to continue with the process of the routine 30. If they are not, the routine is departed at 66.

If the energy states are deemed acceptable at 64, one of two routes may be followed. A first route may typically be followed when attempts to reach equality of input and output speeds have failed on successive attempts, but the difference between the two is suggestive that the clutch is substantially fully engaged, or will likely become so engaged after a short duration of time. In that situation, the clutch is treated as fully engaged as at 60.

Alternatively, if the energy states are acceptable, but suggest that additional attempts for full engagement might be successful, the routine proceeds to 68 where ramp rates $\lambda 1$ and $\lambda 2$ are reevaluated and reset at a point accommodating the present clutch energy and speeds. The ramp rate $\lambda 1$ is then applied at 50 and the assessment of disc pack contact is again made at 52. Assuming that contact has been made within the time limit $\varepsilon 3$, the ramp rate $\lambda 2$ is applied at 54, the input speed determined at 56, and a comparison between the input and output speeds made at 58. If this new process with the new ramp rate has been successful in causing the input and output speeds to be the same, the clutch is fully engaged as at 60 at an engaged set pressure. If, however, there is a difference between the input and output speeds, clutch pressure is again released, a calculation made of the output speed for an updated inertial state at 62. This loop may continue until it is determined at 64 that either the clutch energy is not acceptable or that sufficient efforts have been made to achieve full engagement without success, but with a rational expectation that full engagement will ultimately be achieved, the output of 64 assumes full engagement at 60 and the process terminates.

As seen, the invention contemplates the use of two-stage ramp rates during clutch engagement, those ramp rates being dependent upon the speed of the engine at the time of clutch engagement and the operating temperature of the engine. It has been found that by using this technique, the amount of energy dissipated by the clutch is significantly reduced, thereby increasing the expected life of the clutch itself.

In sum, it will be appreciated that the concept of the invention can be expressed by the formula:

$$Prate = Pbaserate * f(\text{temperature}) * f(\text{speed}) * f(\text{torque}) * f(\Delta W1) * f(\Delta i2) \text{ where:}$$

Prate is the actual pressure rate used for clutch engagement;

Pbaserate is the base pressure rate to be used in the absence of any optimization function;

f(temperature) is a function of engine temperature and can be expressed as either a discrete mapping of temperature multiplier value (off of a table), or an actual function. If temperature optimization is not desired, this function becomes unity;

f(speed) is a function of engine speed and can be expressed as either a discrete mapping of engine speed multiplier values (off of a table) or an actual function. This function should resolve to unity if no engine speed is desired;

f(torque) is a function of engine torque and can be expressed as either a discrete mapping of engine torque multiplier value (off of a table) or an actual function. This should resolve to unity if no engine torque optimization is desired;

f($\Delta W1$) is the engine drawdown rate; and f($\Delta i2$) is the change in inertial status of the output.

It will further be appreciated that, in light of the foregoing and FIG. 1, data regarding the control parameters may be obtained from any of various sources with engine temperature being taken from its coolant, air intake, or a thermistor mounted to the engine or clutch itself. Engine speed can be readily monitored. Moreover, engine information can be provided from the engine to the CANbus/engine controller or can be provided in the form of a CAN packet by the customer. Lookup tables, as suggested by FIG. 3, can be replaced with the formula presented above. It will be appreciated that variables $\Delta \omega 1$ and $\Delta i2$ can be used with either formulas or lookup tables in order to dynamically effect change on the ramp rates.

Thus it can be seen that the various aspects of the invention have been satisfied by the structure and process system presented and described above. While in accordance with the patent statutes only the best mode and preferred embodiment of the invention has been presented and described in detail, the invention is not limited thereto or thereby.

What is claimed is:

1. A method for effecting efficient engagement of a clutch interposed between an engine and a driven unit, comprising:
monitoring operational parameters of the engine and driven unit;
determining from said operational parameters at least two ramp rates for the application of hydraulic pressure to the clutch;
applying hydraulic pressure at a first of said ramp rates to the clutch for a first period;
applying hydraulic pressure at a second of said ramp rates to the clutch for a second period; and
determining from a relationship between input and output speeds of the clutch whether the clutch is fully engaged.

2. The method according to claim 1, wherein when the step of determining whether the clutch is fully engaged is negative, clutch pressure is released, the first and second ramp rates are reevaluated and reset and sequentially applied for the first and second periods.

3. The method according to claim 2, further comprising the step of determining that clutch energy is less than an energy limit prior to determining the two ramp rates.

4. The method according to claim 3, further comprising the step of determining that clutch energy is acceptable prior to reevaluating and resetting the first and second ramp rates.

5. The method according to claim 2, wherein said first period ends upon contact of clutch discs during application of hydraulic pressure at the first ramp rate.

6. The method according to claim 5, wherein the second period begins upon termination of the first period.

7. The method according to claim 6, wherein the second ramp rate is greater than the first ramp rate.

8. The method according to claim 7, wherein the ramp rates increase with temperature and clutch engagement speed.

9. The method according to claim 8, wherein there is a direct relationship between ramp rates and both temperature and clutch engagement speed.

10. A method for effecting efficient engagement of a clutch interposed between an engine and an implement, comprising:
monitoring operational parameters of the engine and implement that impact the engagement;
providing a series of applications and releases of hydraulic pressure to the clutch, each application of hydraulic pressure having at least two ramp rates, a first ramp rate for a first period of the application and a second ramp rate for a second period of the application; and
wherein said ramp rates are set as a function of the operational parameters of the engine and implement.

11. The method according to claim 10, further comprising the step of determining from a relationship between the input and output speeds of the clutch whether the clutch is fully engaged and, if it is not fully engaged, reevaluating and resetting the first and second ramp rates and sequentially reapplying them for first and second periods of applications of hydraulic pressure to the clutch.

* * * * *